(12) United States Patent
Wang

(10) Patent No.: US 9,083,189 B2
(45) Date of Patent: Jul. 14, 2015

(54) DEVICE AND METHOD FOR EQUALIZING VOLTAGES OF ENERGY-STORAGE ELEMENTS

(75) Inventor: Chuangshe Wang, Shenzhen (CN)

(73) Assignee: SHENZHEN QIANGNENG ELECTRIC CO. LTD., Shenzhen Guangdon Province (CN)

( * ) Notice: Subject to any disclaimer, the term of this patent is extended or adjusted under 35 U.S.C. 154(b) by 820 days.

(21) Appl. No.: 13/321,188

(22) PCT Filed: Oct. 27, 2009

(86) PCT No.: PCT/CN2009/001197
§ 371 (c)(1),
(2), (4) Date: Nov. 18, 2011

(87) PCT Pub. No.: WO2010/139099
PCT Pub. Date: Dec. 9, 2010

(65) Prior Publication Data
US 2012/0062038 A1    Mar. 15, 2012

(30) Foreign Application Priority Data

Jun. 3, 2009    (CN) .......................... 2009 1 0107641

(51) Int. Cl.
*H02J 1/00* (2006.01)
*H02J 7/00* (2006.01)
(52) U.S. Cl.
CPC ................................... *H02J 7/0018* (2013.01)
(58) Field of Classification Search
CPC ...................................... H02J 1/00; H02J 3/00

USPC ............................................................ 307/82
See application file for complete search history.

(56) References Cited

U.S. PATENT DOCUMENTS

| | | | | |
|---|---|---|---|---|
| 6,021,052 A | * | 2/2000 | Unger et al. | ..................... 363/26 |
| 7,271,505 B1 | * | 9/2007 | Miettinen | ..................... 307/110 |
| 2008/0278969 A1 | * | 11/2008 | Bolz et al. | ....................... 363/17 |
| 2009/0278496 A1 | * | 11/2009 | Nakao et al. | .................. 320/118 |

FOREIGN PATENT DOCUMENTS

| | | |
|---|---|---|
| CN | 101119037 | 6/2008 |
| JP | 2008005630 | 1/2008 |
| WO | 0122554 | 3/2001 |

OTHER PUBLICATIONS

International Search Report corresponding to PCT/CN2009/001197 dated Mar. 18, 2010.

* cited by examiner

*Primary Examiner* — Rexford Barnie
*Assistant Examiner* — Joseph Inge
(74) *Attorney, Agent, or Firm* — Dentons US LLP

(57) ABSTRACT

A device (3) and a method for equalizing the voltage of an energy-storage element (4) are provided herein. The device (3) comprises at least one transformer (36) and at least one bi-directional DC/AC converter circuit (35). Each transformer (36) comprises at least one equalizing winding (30) and at least one transforming winding (26,27). The DC terminals of each DC/AC converter circuit (35) is adapted to connect to a positive terminal (41) and a negative terminal (42) of the energy-storage element (4), and the AC terminals thereof is connected with the transforming winding (26,27) of the transformer (36).

12 Claims, 8 Drawing Sheets

DEVICE AND METHOD FOR EQUALIZING VOLTAGES OF ENERGY-STORAGE ELEMENTS

FIELD OF THE INVENTION

The present invention relates to a device and a method for equalizing the voltages of energy-storage elements, and more particularly to a device and a method for equalizing the voltages of energy-storage elements such as capacitors, ultra-capacitors, or batteries according to a proportion.

BACKGROUND OF THE INVENTION

As the voltage of a single battery unit is relatively low, multiple single battery units need to be connected in series to form a battery group when in application. With regard to each single battery unit in the battery group, their terminal voltages may be inconsistent due to changes of their capacities, their internal resistances, the working conditions, and the environment. During the process of charging and discharging, some battery units may be subject to an overvoltage or an undervoltage, which may adversely influence overall usage and the service life of the battery group. Therefore, it is necessary to equilibrate the terminal voltage of each single battery unit.

For an ultra-capacitor used as an energy-storage element, the voltage for each single unit is also relatively low. In practical applications, multiple single units need to be connected in series to form an ultra-capacitor group. Each single ultra-capacitor unit therein, however, may have an inconsistent terminal voltage because of the changes of their capacities, materials, manufacturing processes, working conditions, and the environment. During the charging process, some ultra-capacitor units may be subjected to an overvoltage, which will influence the service life and the usage of the ultra-capacitor group adversely. Similarly, it is also necessary to equilibrate the terminal voltage of each ultra-capacitor unit.

Capacitors are widely used in various types of power supply. In some cases, they are connected in series. Due to their capacity variance, current leakage variance, and the like, each of the capacitors connected in series has an inconsistent voltage, which readily results in an overvoltage failure of some capacitors. Thus, it is necessary to equilibrate the voltages of the capacitors connected in series.

In practice, an energy-storage element group may consist of two or more groups of battery units or capacitors, and in each group, the number and/or terminal voltages of single units may be different. As a result, it is also necessary to equilibrate the terminal voltages of the two or more groups with different terminal voltages or the terminal voltages of different types of energy-storage element groups according to a proportion during the charging and discharging processes; and it is also an issue needed to be addressed to make the terminal voltage of each single unit in various energy-storage element groups be equilibrated with that of each single unit in other energy-storage element group.

In addition, in one systematic equipment or one district, when various energy-storage elements are distributed dispersely, it is necessary to equilibrate the voltage of each energy-storage element and share the energy proportionally.

SUMMARY OF THE INVENTION

To solve the above problems, the present invention provides a device and a method for equalizing the voltages of energy-storage elements. The technical solutions according to the embodiments of the present invention are as follows.

According to a first aspect of an embodiment of the present invention, there is provided a device for equalizing the voltages of energy-storage elements, comprising: at least one transformer comprising at least one equalizing winding and at least one transforming winding; and at least one bi-directional DC/AC converter circuit; wherein DC terminals of each bi-directional DC/AC converter circuit are configured as a positive terminal and a negative terminal adapted to connect to an energy-storage element, and AC terminals of each bi-directional DC/AC converter circuit are connected with the transforming winding of the transformer.

According to a second aspect of an embodiment of the present invention, there is further provided a device for equalizing the voltages of energy-storage elements, comprising: at least one transformer including at least two windings, in which one of the windings is a transforming winding, and at least one of the windings is an equalizing winding; at least one bi-directional DC/AC converter circuit, wherein the DC terminals of each bi-directional DC/AC converter circuit are configured as a positive terminal and a negative terminal adapted to connect to the energy-storage element, and the AC terminals of each bi-directional DC/AC converter circuit are connected with the transforming winding of the transformer; and at least one bi-directional AC/DC converter circuit, with its AC terminals connected with the equalizing winding of the transformer.

According to a third aspect of an embodiment of the present invention, there is still provided a device for equalizing the voltages of energy-storage elements, comprising: at least one transformer comprising two or more transforming windings; and two or more bi-directional DC/AC converter circuits; wherein DC terminals of each bi-directional DC/AC converter circuit are configured as a positive terminal and a negative terminal adapted to connect to the energy-storage elements, and AC terminals of each bi-directional DC/AC converter circuit are connected with the transforming windings of the transformer.

According to a fourth aspect of an embodiment of the present invention, there is provided an energy-storage element, comprising the device according to the first aspect, the second aspect, and/or the third aspect of an embodiment of the present invention.

According to a fifth aspect of an embodiment of the present invention, there is provided an electrical equipment, comprising the device according to the first aspect, the second aspect, and/or the third aspect of an embodiment of the present invention.

According to a sixth aspect of an embodiment of the present invention, there is provided a method for equalizing the voltages of energy-storage elements, comprising steps: using a bi-directional DC/AC converter circuit, respectively performing a DC/AC conversion on the terminal voltage of each energy-storage element which is higher than a value to be realized by the energy-storage element according to a predetermined voltage ratio to be realized by all energy-storage elements; coupling the DC/AC converted voltage into same pair of equalizing buses through a transformer; and coupling the voltage from the equalizing buses respectively to a bi-directional DC/AC converter circuit corresponding to each energy-storage element with a terminal voltage lower than a value to be realized through the transformer, and then respectively converting the voltage in a manner of AC/DC conversion to each energy-storage element with the terminal voltage lower than a value to be realized.

According to a seventh aspect of an embodiment of the present invention, there is further provided a method for equalizing the voltages of energy-storage elements, comprising steps: using a bi-directional DC/AC converter circuit, respectively performing a DC/AC conversion on the terminal voltage of each energy-storage element which is higher than a value to be realized by the energy-storage element according to a predetermined voltage ratio to be realized by all energy-storage elements; and respectively coupling the DC/AC converted voltage to a bi-directional DC/AC converter circuit corresponding to each energy-storage element with a terminal voltage lower than a value to be realized through a multi-winding transformer, and then respectively converting the voltage in a manner of AC/DC conversion to each energy-storage element with the terminal voltage lower than a value to be realized.

In which 1: First equalizing bus, 2: Second equalizing bus, 3: equalizing device, 4: Energy-storage element, 5: Synchronous control bus, 35: Bi-directional DC/AC converter circuit, 37: Bi-directional AC/DC converter circuit, 36: Transformer, 28, 29: Driving winding of the transformer, 26, 27: Transforming winding of the transformer, 30: Equalizing winding of the transformer, 21, 66, 67, 68: Capacitor, 22, 24: Diode, 23, 25: Conductor switch, 43, 44, 45, 46, 63, 64, 65: Resistor.

DETAILED DESCRIPTION OF THE INVENTION

In the specification of the present invention, an energy-storage element refers to an element that can absorb and release direct current (DC) electrical energy, including a battery, a capacitor, an ultra-capacitor, and the like, which can be a single unit or a combination of multiple single units, and has a positive terminal and a negative terminal. There is no limitation here to the mutual relations between the energy-storage elements, and they can be disconnected or connected in series or in parallel.

According to the specification of the present invention, a first equalizing bus and a second equalizing bus refer to two wires. The voltage between the first equalizing bus and the second equalizing bus is an equalizing bus voltage, which can be set to any value excluding zero. The equalizing bus voltage can be a DC voltage or an AC voltage, which depends upon the adopted circuit. If the equalizing bus voltage is an AC voltage, it is equivalent to a DC voltage when circuit analysis and comparison are performed.

The theoretical basis for realizing proportional voltage equalization according to the present invention lies in that: in a transformer with multiple windings wound on the same magnetic core, the proportion of AC voltages at two ends of each winding equals to the proportion of the turn numbers in the corresponding windings; all the electronic elements connected in parallel have equal terminal voltages; if the electronic elements have different terminal voltages before being connected in parallel, the current will flow from the electronic element with a higher terminal voltage to the one with a lower terminal voltage after connection in parallel, and finally, all the electronic elements connected in parallel have equal terminal voltages. The proportional voltage equalization refers to that the terminal voltages of energy-storage elements are in proportion after being equalized. The present invention is described below in detail with reference to the specific embodiments.

Figure 1:
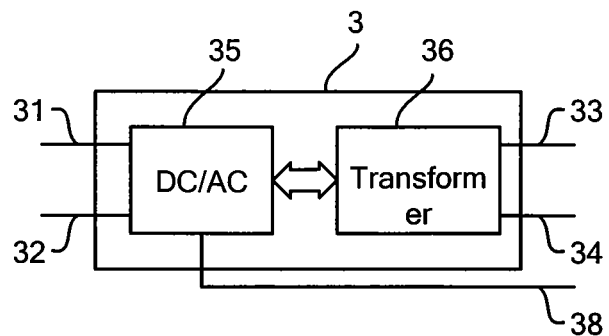
FIG. 1 is a circuit block diagram of an equalizing device according to a first embodiment of the present invention.

FIG. 1 is a circuit block diagram of an equalizing device for equalizing the voltage of an energy-storage element according to a first embodiment of the present invention. The equalizing device includes a bi-directional DC/AC converter circuit 35 and a transformer 36. The bi-directional DC/AC converter circuit 35 has DC terminals and AC terminals. The transformer 36 includes two windings, in which one is a transforming winding and the other is an equalizing winding. The equalizing device 3 has four terminals, namely, a positive terminal 31, a negative terminal 32, a first equalizing terminal 33, and a second equalizing terminal 34. The positive terminal 31 and the negative terminal 32 are led out from the DC terminals of the bi-directional DC/AC converter circuit 35 for connecting with the energy-storage element, and the AC terminals of the bi-directional DC/AC converter circuit 35 are connected with the transforming winding of the transformer 36. Two terminals led from the equalizing winding of the transformer 36 serve as the first equalizing terminal 33 and the second equalizing terminal 34.

In use, each pair of positive terminal 31 and negative terminal 32 in two or more devices shown in FIG. 1 are respectively connected to a positive terminal and a negative terminal of each of the energy-storage elements, and the first equalizing terminal 33 and the second equalizing terminal 34 of each device 3 are respectively connected with each other. Thus, according to the circuit shown in FIG. 1, a DC voltage applied between the positive terminal 31 and the negative terminal 32 can be converted into an AC voltage by using the bi-directional DC/AC converter circuit 35, and then isolated and transformed into an AC voltage between the first equalizing terminal 33 and the second equalizing terminal 34 via the transformer 36. Alternatively, the transformer 36 isolatedly transforms the AC voltage between the first equalizing terminal 33 and the second equalizing terminal 34 to the AC terminals of the bi-directional DC/AC converter circuit 35 which then converts the voltage into a DC voltage between the positive terminal 31 and the negative terminal 32.

In addition, if it is needed for the bi-directional DC/AC converter circuit 35 in the equalizing device 3 to adopt external signals and other modes to synchronize the equalizing device 3, a synchronous terminal 38 can be optionally provided in the equalizing device 3. The synchronous terminal 38 is connected with the bi-directional DC/AC converter circuit 35.

Figure 2:
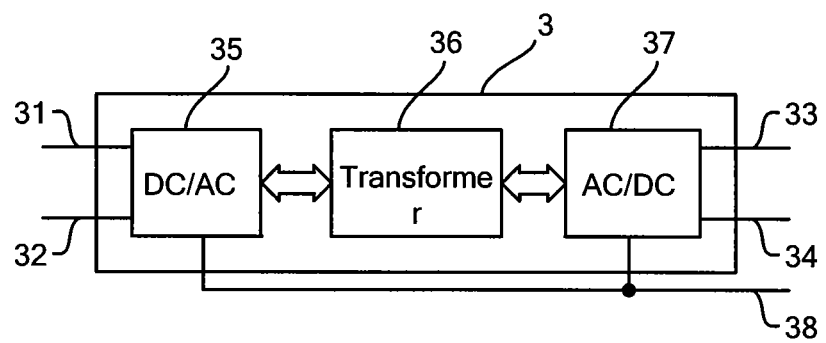
FIG. 2 is a circuit block diagram of an equalizing device according to a second embodiment of the present invention.

FIG. 2 is a circuit block diagram of an equalizing device for equalizing the voltage of an energy-storage element according to a second embodiment of the present invention. Based on the circuit shown in FIG. 1, a bi-directional AC/DC converter circuit 37 is added to it. The AC terminals of the bi-directional AC/DC converter circuit 37 are connected with the equalizing winding of the transformer 36, and the DC terminals of the bi-directional AC/DC converter circuit 37 leads out two terminals to act as the first equalizing terminal 33 and the second equalizing terminal 34.

Similar to the device shown in FIG. 1, in use, according to the circuit shown in FIG. 2, a DC voltage applied between the positive terminal 31 and the negative terminal 32 is converted into an AC voltage by using the bi-directional DC/AC converter circuit 35; then, the transformer 36 isolatedly transforms it to the AC terminals of the bi-directional AC/DC converter circuit 37; and finally, the bi-directional AC/DC converter circuit 37 converts the voltage into a DC voltage between the first equalizing terminal 33 and the second equalizing terminal 34. Alternatively, the DC voltage between the first equalizing terminal 33 and the second equalizing terminal 34 is converted into an AC voltage by using the bi-directional AC/DC converter circuit 37; then, the transformer 36 isolatedly transforms it to the AC terminals of the bi-directional DC/AC converter circuit 35; and finally, the voltage is converted to the DC voltage between the positive terminal 31 and the negative terminal 32 by means of the bi-directional DC/AC converter circuit 35.

Furthermore, if it is needed for the bi-directional DC/AC converter circuit 35 and the bi-directional AC/DC converter circuit 37 in the equalizing device 3 to adopt an external signal and other modes to synchronize the equalizing device 3, a synchronous terminal 38 can be optionally provided in the equalizing device 3. The synchronous terminal 38 is respectively connected to the bi-directional DC/AC converter circuit 35 and/or the bi-directional AC/DC converter circuit 37.

Figure 3:
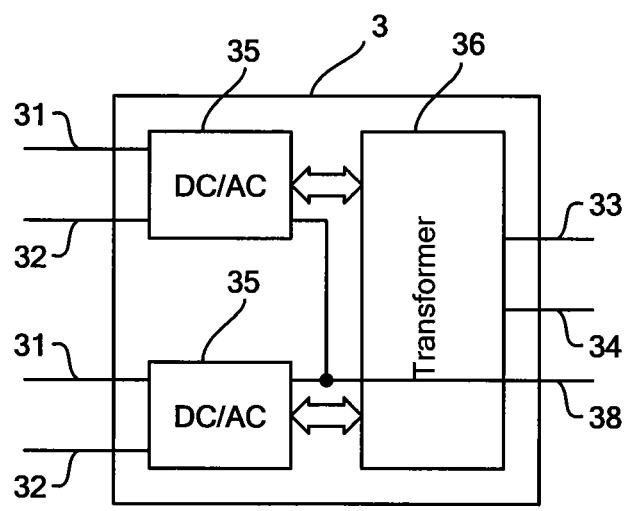
FIG. 3 is a circuit block diagram of an equalizing device according to a third embodiment of the present invention.

FIG. 3 is a circuit block diagram of an equalizing device for equalizing the voltage of an energy-storage element according to a third embodiment of the present invention. The circuit shown in FIG. 3 consists of two bi-directional DC/AC converter circuits 35 and one transformer 36. Each of the bi-directional DC/AC converter circuits 35 has DC terminals and AC terminals. The transformer 36 includes three windings, in which two are transforming windings, and the remaining is an equalizing winding. The equalizing device 3 has six terminals, namely, two pairs of positive terminal 31 and negative terminal 32, a first equalizing terminal 33, and a second equalizing terminal 34. Each pair of positive terminal 31 and negative terminal 32 is led from the DC terminals of each bi-directional DC/AC converter circuit 35, for connecting with the energy-storage element. The AC terminals of each bi-directional DC/AC converter circuit 35 are connected with one transforming winding of the transformer 36. The equalizing winding of the transformer 36 leads out two terminals to serve as the first equalizing terminal 33 and the second equalizing terminal 34.

In use, according to the circuit shown in FIG. 3, a DC voltage applied between each pair of positive terminal 31 and negative terminal 32 can be respectively converted into an AC voltage by means of the corresponding bi-directional DC/AC converter circuit 35; then, the transformer 36 isolatedly transforms it to an AC voltage between the first equalizing terminal 33 and the second equalizing terminal 34. Alternatively, an AC voltage between the first equalizing terminal 33 and the second equalizing terminal 34 is isolatedly transformed by the transformer 36 to the AC terminals of each bi-directional DC/AC converter circuit 35; then, each bi-directional DC/AC converter circuit 35 respectively converts the voltage into the DC voltage between each pair of positive terminal 31 and negative terminal 32; meanwhile, the DC voltage between certain pair of positive terminal 31 and negative terminal 32 is converted into an AC voltage by means of the bi-directional DC/AC converter circuit 35 connected thereto, and then the voltage is isolatedly transformed to the AC terminals of the other bi-directional DC/AC converter circuit 35 by the transformer 36, and finally, the voltage is converted into a DC voltage between the other pair of positive terminal 31 and negative terminal 32 by means of the bi-directional DC/AC converter circuit 35. Besides, the two bi-directional DC/AC converter circuits 35 work synchronously in the equalizing device 3, and if it is needed for the bi-directional DC/AC converter circuits 35 to adopt an external signal and other modes to synchronize the equalizing device 3, a synchronous terminal 38 can be optionally provided in the equalizing device 3. The synchronous terminal 38 is connected to each of the bi-directional DC/AC converter circuits 35.

In the circuit shown in FIG. 3, the ratio of the turn number of the transforming winding of the transformer 36 corresponding to each pair of positive terminal 31 and negative terminal 32 to the turn number of the equalizing winding of the transformer 36 is set to be equal to a ratio of voltages to be realized in the energy-storage elements and applied between each pair of positive terminal 31 and negative terminal 32, that is, an equalizing ratio.

In the circuit shown in FIG. 3, the equalizing device 3 can isolate a voltage applied between each pair of positive terminal 31 and negative terminal 32 from a voltage between the first equalizing terminal 33 and the second equalizing terminal 34, and realize bi-directional conversion therebetween. If a ratio of the turn number of the transforming winding of the transformer 36 connected to the first bi-directional DC/AC converter circuit 35 to the turn number of the equalizing winding of the transformer 36 is k1, and a ratio of the turn number of the transforming winding of the transformer 36 connected to the second bi-directional DC/AC converter circuit 35 to the turn number of the equalizing winding is k2, the ratio of the voltage between the first pair of positive terminal 31 and negative terminal 32 to the voltage between the first equalizing terminal 33 and the second equalizing terminal 34 is k1, and the ratio of the voltage between the second pair of positive terminal 31 and negative terminal 32 to the voltage between the first equalizing terminal 33 and the second equalizing terminal 34 is k2. When the circuit operates, if the ratio of the voltage applied between the $j^{th}$ pair of positive terminal 31 and negative terminal 32 to the voltage between the first equalizing terminal 33 and the second equalizing terminal 34 is higher than kj, where $1 \leq j \leq 2$, energy will automatically flow towards the transformer 36 through the $j^{th}$ pair of positive terminal 31 and negative terminal 32; otherwise, the energy will automatically flow from the transformer 36 towards the $j^{th}$ pair of positive terminal 31 and negative terminal 32, resulting in:

the voltage applied between the first pair of positive terminal 31 and negative terminal 32: the voltage applied between the second pair of positive terminal 31 and negative terminal 32: the voltage between the first equalizing terminal 33 and the second equalizing terminal 34=k1:k2:1.

Thus, the voltages applied between each pair of positive terminal 31 and negative terminal 32 of the two bi-directional DC/AC converter circuits 35 are proportionally equalized.

The circuit shown in FIG. 3 includes two bi-directional DC/AC converter circuits 35, and the device shown in FIG. 3 can proportionally equalize the voltages of two energy-storage elements connected between two pairs of positive terminals 31 and negative terminals 32. If, in the circuit of the equalizing device 3 shown in FIG. 3, a bi-directional DC/AC converter circuit 35 is added, a transforming winding is added to the transformer 36, and a pair of positive terminal 31 and negative terminal 32 are added to the equalizing 3, the circuit can proportionally equalize voltages of more than two energy-storage elements. With regard to the equalizing principle, an analysis of circuits of the equalizing device 3 having two bi-directional DC/AC converter circuits 35 can be referred to. In addition, two or more devices shown in FIG. 3 can be used together. In this case, each pair of positive terminal 31 and negative terminal 32 are respectively connected to the positive and negative terminals of each energy-storage element, and the first equalizing terminal 33 and the second equalizing terminal 34 of each device 3 are respectively connected together.

Figure 4:
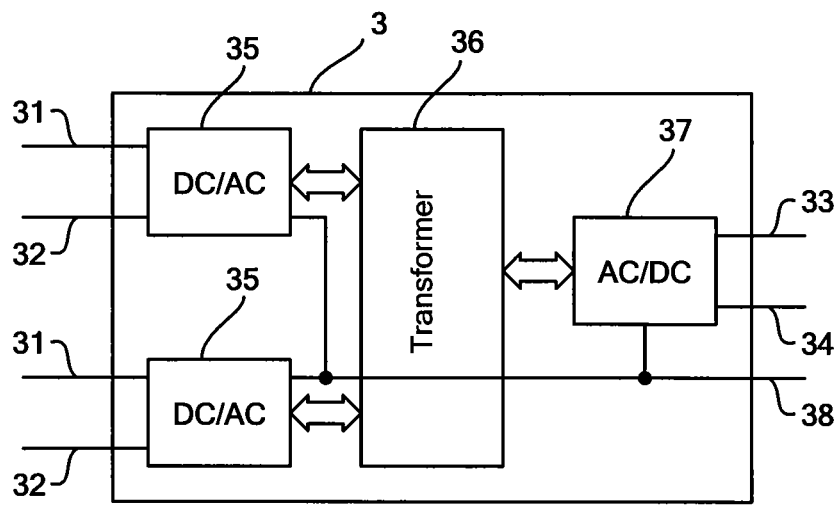
FIG. 4 is a circuit block diagram of an equalizing device according to a fourth embodiment of the present invention.

FIG. 4 is a circuit block diagram of an equalizing device for equalizing the voltage of an energy-storage element according to a fourth embodiment of the present invention. On the basis of the circuit shown in FIG. 3, a bi-directional AC/DC converter circuit 37 is added to it. The AC terminals of the bi-directional AC/DC converter circuit 37 is connected with the equalizing winding of the transformer 36, and the DC terminals of the bi-directional AC/DC converter circuit 37 leads out two terminals to serve as the first equalizing terminal 33 and the second equalizing terminal 34. Similarly, the device shown in FIG. 4 can be extended to increase the amount of energy-storage elements equalized by it, with its working mode and equalizing principle similar to those for the device shown in FIG. 3.

Figure 5:
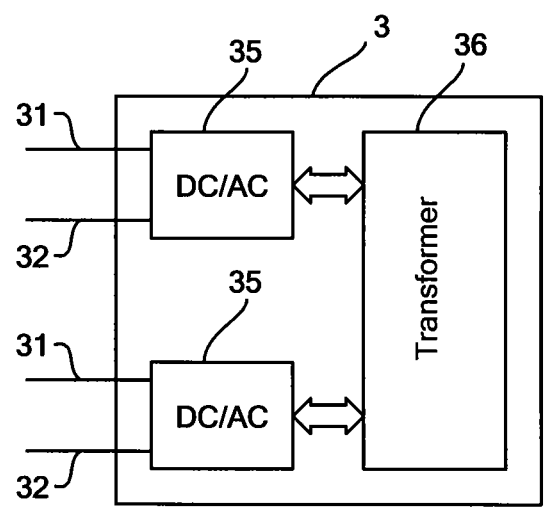
FIG. 5 is a circuit block diagram of an equalizing device according to a fifth embodiment of the present invention.

FIG. 5 is a circuit block diagram of an equalizing device for equalizing the voltage of an energy-storage element according to a fifth embodiment of the present invention. The circuit shown in FIG. 5 includes two bi-directional DC/AC converter circuits 35 and one transformer 36. Each bi-directional DC/AC converter circuit 35 has DC terminals and AC terminals, and the transformer 36 has two (or more) transforming windings. The equalizing device 3 has two (or more) pairs of positive terminal 31 and negative terminal 32. Each pair of positive terminal 31 and negative terminal 32 are respectively led out from the DC terminals of each bi-directional DC/AC converter circuit 35, for connecting with each energy-storage element. The AC terminals of each bi-directional DC/AC converter circuit 35 are connected with one transforming winding of the transformer 36.

In use, the circuit shown in FIG. 5 converts the DC voltage across one pair of positive terminal 31 and negative terminal 32 into an AC voltage by the bi-directional DC/AC converter circuit 35 connected thereto; then, the transformer 36 isolatedly transforms it to the AC terminals of the other bi-directional DC/AC converter circuit 35; and finally, this bi-directional DC/AC converter circuit 35 converts the voltage into a DC voltage between the other pair of positive terminal 31 and negative terminal 32, and vice versa. The two bi-directional DC/AC converter circuits 35 in the equalizing device 3 operate synchronously.

In the circuit shown in FIG. 5, the ratio of the turn numbers of the transforming windings of the transformer 36 corresponding to each pair of positive terminal 31 and negative terminal 32 is set to being equal to that of the voltages to be realized by each energy-storage element and applied between each pair of positive terminal 31 and negative terminal 32, that is, equalizing ratio.

In the circuit shown in FIG. 5, the equalizing device 3 isolates the voltages between the two (or more) pairs of positive terminal 31 and negative terminal 32 and carries out bi-directional conversion. If the ratio of the turn number of the transforming winding of the transformer 36 connected to the first bi-directional DC/AC converter circuit 35 to the turn number of the transforming winding of the transformer 36 connected to the second bi-directional DC/AC converter circuit 35 is k, the ratio of the voltage between the first pair of positive terminal 31 and negative terminal 32 to that between the second pair of positive terminal 31 and negative terminal 32 is k. When the circuit works, if the ratio of the voltage between the first pair of positive terminal 31 and negative terminal 32 to that between the second pair of positive terminal 31 and negative terminal 32 is higher than k, energy will automatically flow from the first pair of positive terminal 31 and negative terminal 32 towards the second pair of positive terminal 31 and negative terminal 32; otherwise, the energy will automatically flow from the second pair of positive terminal 31 and negative terminal 32 towards the first pair of positive terminal 31 and negative terminal 32; and finally:

the voltage between the first pair of positive terminal 31 and negative terminal 32:the voltage between the second pair of positive terminal 31 and negative terminal 32=k.

Thus, the voltages applied between the positive terminal 31 and the negative terminal 32 of the two bi-directional DC/AC converter circuits 35 are equalized proportionally.

Although the circuit shown in FIG. 5 only includes two bi-directional DC/AC converter circuits 35, the circuit of the equalizing device 3 shown in FIG. 5 can be added with a bi-directional DC/AC converter circuit 35; meanwhile, the transformer 36 are correspondingly added with a transforming winding, and the equalizing device 3 can be added with a positive terminal 31 and a negative terminal 32. Thus, the equalizing device 3 isolates voltages between all pairs of positive terminals 31 and negative terminals 32 from one another and carries out bi-directional conversions, so as to proportionally equalize the voltages of two or more energy-storage elements.

Figure 6:
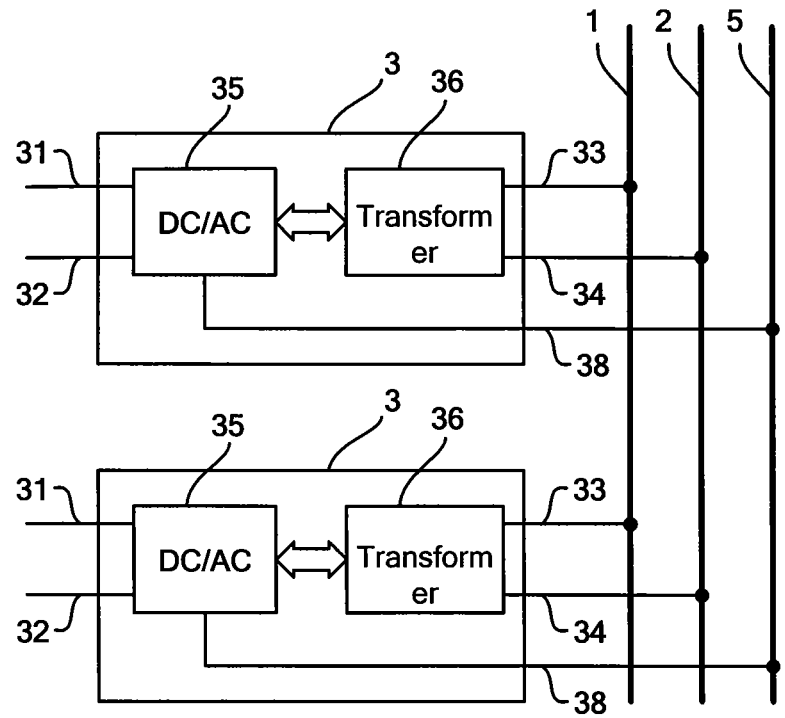
FIG. 6 is a circuit block diagram of an equalizing device according to a sixth embodiment of the present invention.

FIG. 6 is a circuit block diagram of an equalizing device for equalizing the voltage of an energy-storage element according to a sixth embodiment of the present invention. The equalizing device in FIG. 6 includes two equalizing devices 3 shown in FIG. 1, and further a first equalizing bus 1 and a second equalizing bus 2. The first equalizing terminal 33 of each equalizing device 3 is connected to the first equalizing bus 1, and the second equalizing terminal 34 of each Equalizing device 3 is connected to the second equalizing bus 2. The voltage across the equalizing buses is an AC voltage. Furthermore, if an external signal is needed to synchronize the operation of the circuits in the two equalizing devices 3, a synchronous control bus 5 can be further provided. The synchronous control bus 5 is one wire or one group of wires. Each equalizing device 3 is provided with a synchronous terminal 38, and the synchronous terminal 38 of each equalizing device 3 is connected to the synchronous control bus 5.

In the circuit shown in FIG. 6, the ratio of the turn number of the transforming winding of the transformer 36 corresponding to the positive terminal 31 and the negative terminal 32 of each equalizing 3 to the turn number of the equalizing winding of the transformer 36 equals to the ratio of voltages to be realized by each energy-storage element and applied between the positive terminal 31 and the negative terminal 32 of each equalizing device, that is, equalizing ratio.

In the circuit shown in FIG. 6, each equalizing device 3 can perform bi-directional conversions on the voltages between the positive terminal 31 and the negative terminal 32 and the voltage between the equalizing buses. If the ratio of the turn number of the transforming winding of the transformer 36 in the first equalizing device 3 to the turn number of the equalizing winding thereof is k1, and the ratio of the turn number of the transforming winding of the transformer 36 in the second equalizing device 3 to the turn number of the equalizing winding thereof is k2, the ratio of the voltage between the positive terminal 31 and the negative terminal 32 of the first equalizing device 3 to that between the equalizing buses is k1, and the ratio of the voltage between the positive terminal 31 and the negative terminal 32 of the second equalizing device 3 to that between the equalizing buses is k2. When the circuit operates, if the ratio of the voltage applied between the positive terminal 31 and the negative terminal 32 of the $j^{th}$ equalizing device 3 to that between the equalizing buses is higher than kj, where $1 \leq j \leq 2$, energy will automatically flow from the $j^{th}$ pair of positive terminal 31 and negative terminal 32 to the equalizing buses; otherwise, the energy will automatically flow from the equalizing buses to the $j^{th}$ pair of positive terminal 31 and negative terminal 32; and finally:

the voltage applied between the positive terminal 31 and the negative terminal 32 of the first equalizing device 3:the voltage applied between the positive terminal 31 and the negative terminal 32 of the second equalizing device 3:equalizing bus voltage=k1:k2:1.

Thus, the voltages applied between the positive terminals 31 and the negative terminals 32 of the two equalizing devices 3 are equalized proportionally.

If another equalizing device 3 shown in FIG. 6 is further added, voltages of more than two energy-storage elements can be equalized proportionally, with the equalizing principle similar to the preceding circumstance in which two equalizing devices 3 are included.

Figure 7:
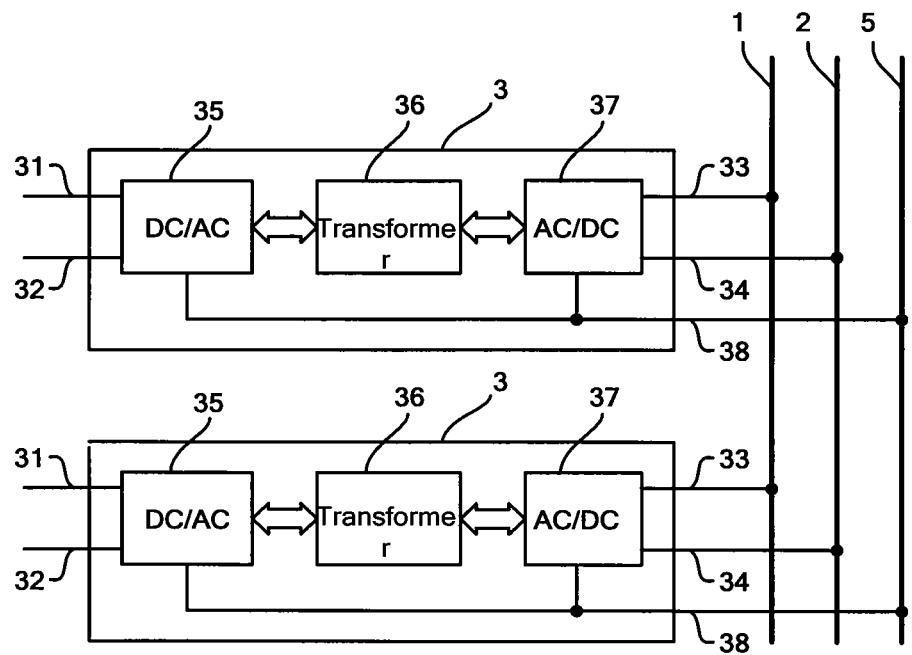
FIG. 7 is a circuit block diagram of an equalizing device according to a seventh embodiment of the present invention.

FIG. 7 is a circuit block diagram of an equalizing device for equalizing the voltage of an energy-storage element according to a seventh embodiment of the present invention. In the device shown in FIG. 7, the equalizing device 3 of FIG. 1 adopted in FIG. 6 is replaced by the equalizing device 3 of FIG. 2. In FIG. 7, the equalizing bus voltage is a DC voltage, with its working mode and equalizing principle similar to FIG. 6, and the device shown in FIG. 7 can equalize voltages of two or more energy-storage elements proportionally.

Figure 8:
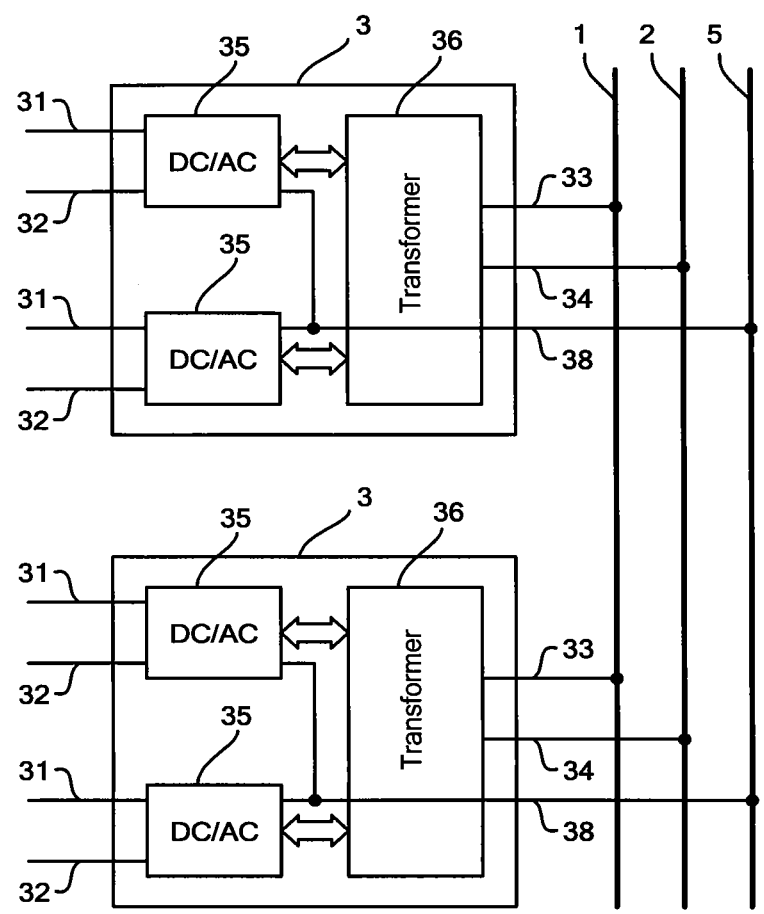
FIG. 8 is a circuit block diagram of an equalizing device according to an eighth embodiment of the present invention.

FIG. 8 is a circuit block diagram of an equalizing device for equalizing the voltage of an energy-storage element according to an eighth embodiment of the present invention. The equalizing device shown in FIG. 8 includes two equalizing devices 3 shown in FIG. 3 and further includes a first equalizing bus 1 and a second equalizing bus 2. The first equalizing terminal 33 of each equalizing device 3 is connected to the first equalizing bus 1, and the second equalizing terminal 34 of each equalizing device 3 is connected to the second equalizing bus 2. The equalizing bus voltage is an AC voltage. In addition, if an external signal is needed to synchronize the operation of the circuits in the two equalizing devices 3, a synchronous control bus 5 can be further provided. The synchronous control bus 5 can be one wire or a group of wires. Each equalizing device 3 is provided with a synchronous terminal 38, and the synchronous terminal 38 of each equalizing device 3 is connected with the synchronous control bus 5.

In the circuit shown in FIG. 8, each equalizing device 3 has two pairs of positive terminals 31 and negative terminals 32. The ratio of the turn number of the transforming winding of the transformer 36 in the equalizing device 3 corresponding to each pair of positive terminal 31 and negative terminal 32 to the turn number of the equalizing winding thereof equals to the ratio of the voltages to be realized by each energy-storage element and applied between each pair of positive terminal 31 and negative terminal 32 in each equalizing device 3, that is, equalizing ratio.

In the circuit shown in FIG. 8, each equalizing device 3 can perform bi-directional conversion on the voltage between each pair of positive terminal 31 and negative terminal 32 and the equalizing bus voltage. In the first equalizing device 3, if the ratio of the turn number of the transforming winding of the transformer 36 connected with the first bi-directional DC/AC converter circuit 35 to the turn number of the equalizing winding thereof is k1, and the ratio of the turn number of the transforming winding of the transformer 36 connected with the second bi-directional DC/AC converter circuit 35 to the turn number of the equalizing winding thereof is k2, the ratio of the voltage between the first pair of positive terminal 31 and negative terminal 32 to the equalizing bus voltage is k1, and the ratio of the voltage between the second pair of positive terminal 31 and negative terminal 32 to the equalizing bus voltage is k2. In the second equalizing device 3, if the ratio of the turn number of the transforming winding of the transformer 36 connected with the third bi-directional DC/AC converter circuit 35 to the turn number of the equalizing winding thereof is k3, and the ratio of the turn number of the transforming winding of the transformer 36 connected with the fourth bi-directional DC/AC converter circuit 35 to the turn number of the equalizing winding thereof is k4, the ratio of the voltage between the third pair of positive terminal 31 and negative terminal 32 to the equalizing bus voltage is k3, and the ratio of the voltage between the fourth pair of positive terminal 31 and negative terminal 32 to the equalizing bus voltage is k4. When the circuit works, if the ratio of the voltage applied between the $j^{th}$ pair of positive terminal 31 and negative terminal 32 to the equalizing bus voltage is higher than kj, where $1 \leq j \leq 4$, energy will automatically flow from the $j^{th}$ pair of positive terminal 31 and negative terminal 32 towards the equalizing buses; otherwise, the energy will automatically flow from the equalizing buses to the $j^{th}$ pair of positive terminal 31 and negative terminal 32; and finally:

the voltage applied between the first pair of positive terminal 31 and negative terminal 32:the voltage applied between the second pair of positive terminal 31 and negative terminal 32:the voltage applied between the third pair of positive terminal 31 and negative terminal 32:the voltage applied between the fourth pair of positive terminal 31 and negative terminal 32:the equalizing bus voltage=k1:k2:k3:k4:1.

Thus, the voltages applied between four pairs of positive terminals 31 and negative terminals 32 of the two equalizings 3 are equalized proportionally.

Each equalizing device 3 in FIG. 8 includes two bi-directional DC/AC converter circuits 35, which can proportionally equalize the voltages of two energy-storage elements connected to the two pairs of positive terminals 31 and negative terminals 32. A bi-directional DC/AC converter circuit 35 can be added to any equalizing device 3 or the two Equalizing devices 3 in FIG. 8; and meanwhile, a transforming winding of the transformer 36 are added correspondingly. Thus, the circuit shown in FIG. 8 can equalize voltages of more energy-storage elements proportionally. Alternatively, the equalizing device 3 of FIG. 1 or FIG. 3 can be further added into the circuit of FIG. 8, so as to equalize the voltages of more energy-storage elements proportionally. For the circuit equalizing principles, analyses on the circuits in FIG. 1, FIG. 3, FIG. 6, and FIG. 8 can be referred to.

Figure 9:
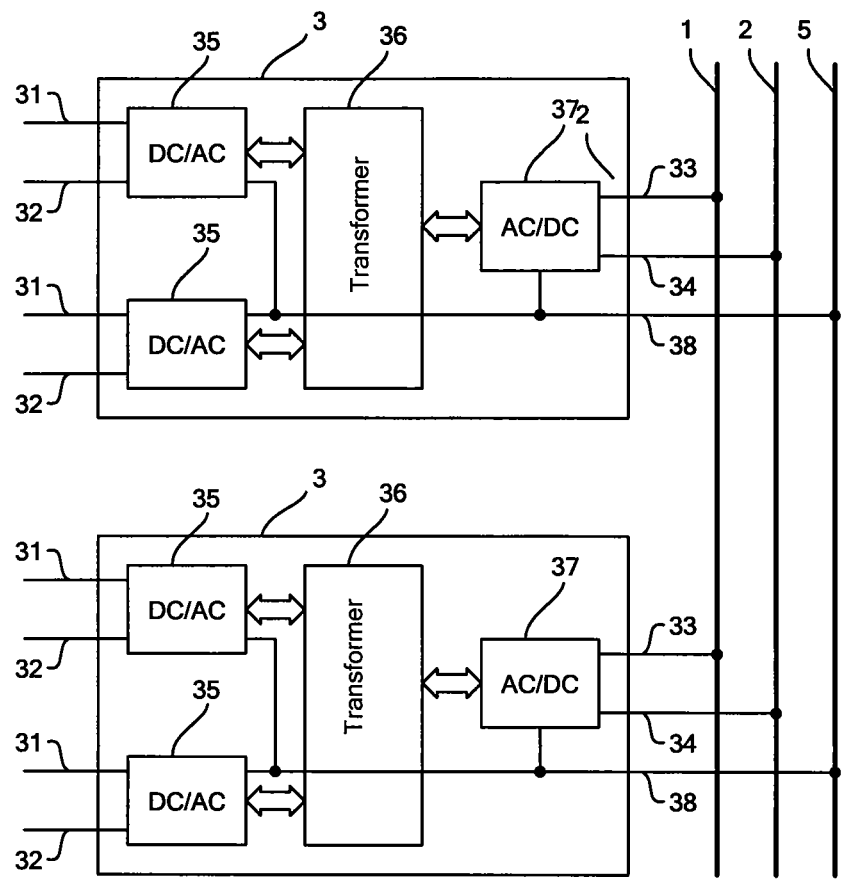
FIG. 9 is a circuit block diagram of an equalizing device according to a ninth embodiment of the present invention.

FIG. 9 is a circuit block diagram of an equalizing device for equalizing the voltage of an energy-storage element according to a ninth embodiment of the present invention. In the circuit shown in FIG. 9, the equalizing device 3 of FIG. 3 used in the circuit shown in FIG. 8 is replaced by the equalizing device 3 of FIG. 4. The equalizing bus voltage in FIG. 9 is a DC voltage. The working mode and equalizing principle of the circuit shown in FIG. 9 are similar to those of the circuit in FIG. 8. However, the synchronous control bus and the synchronous control terminal therein are optional.

Figure 12:
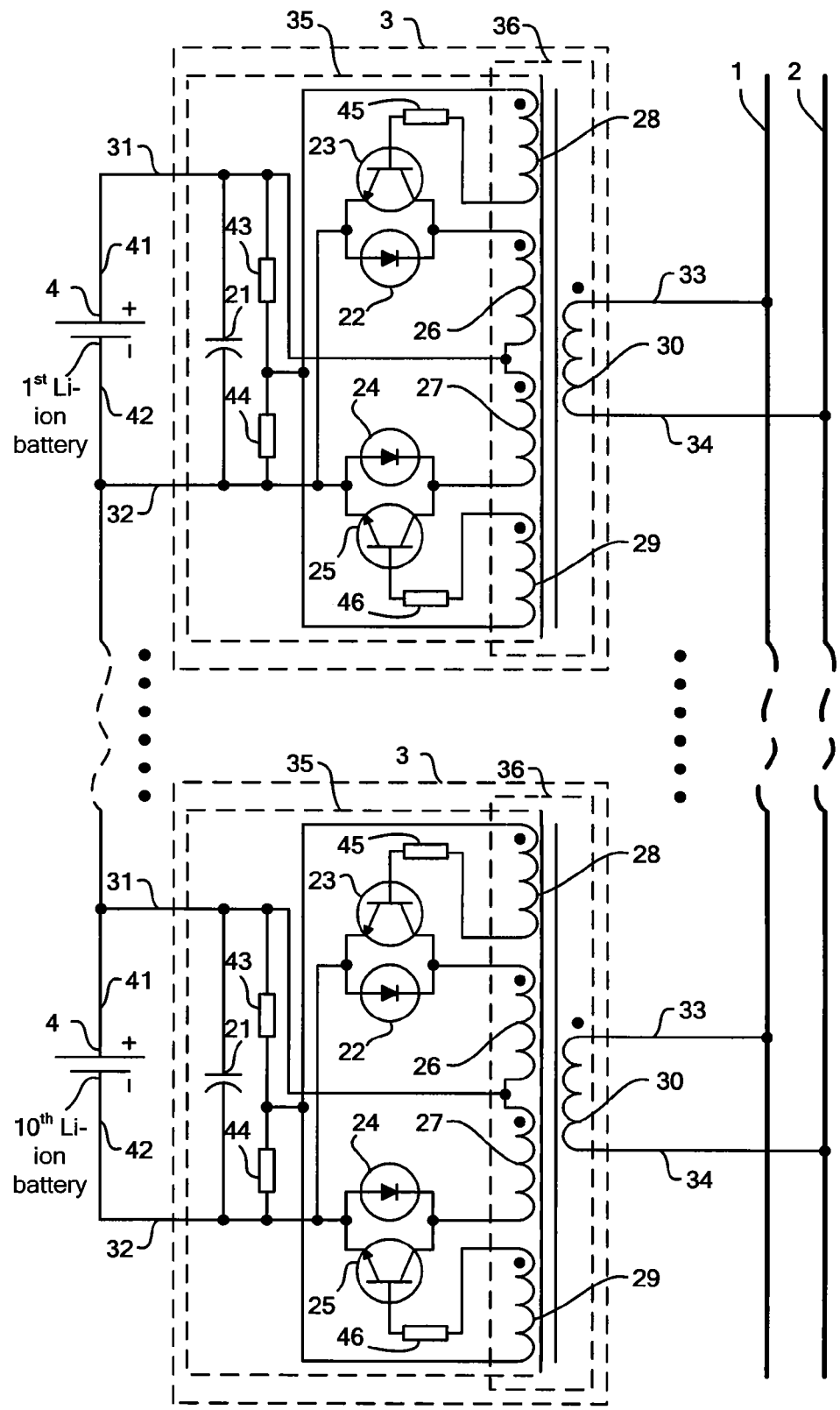
FIG. 12 is a circuit diagram showing an equalizing device to equalize a voltage of 10 Li-ion batteries according to an embodiment of the present invention.
Figure 13:
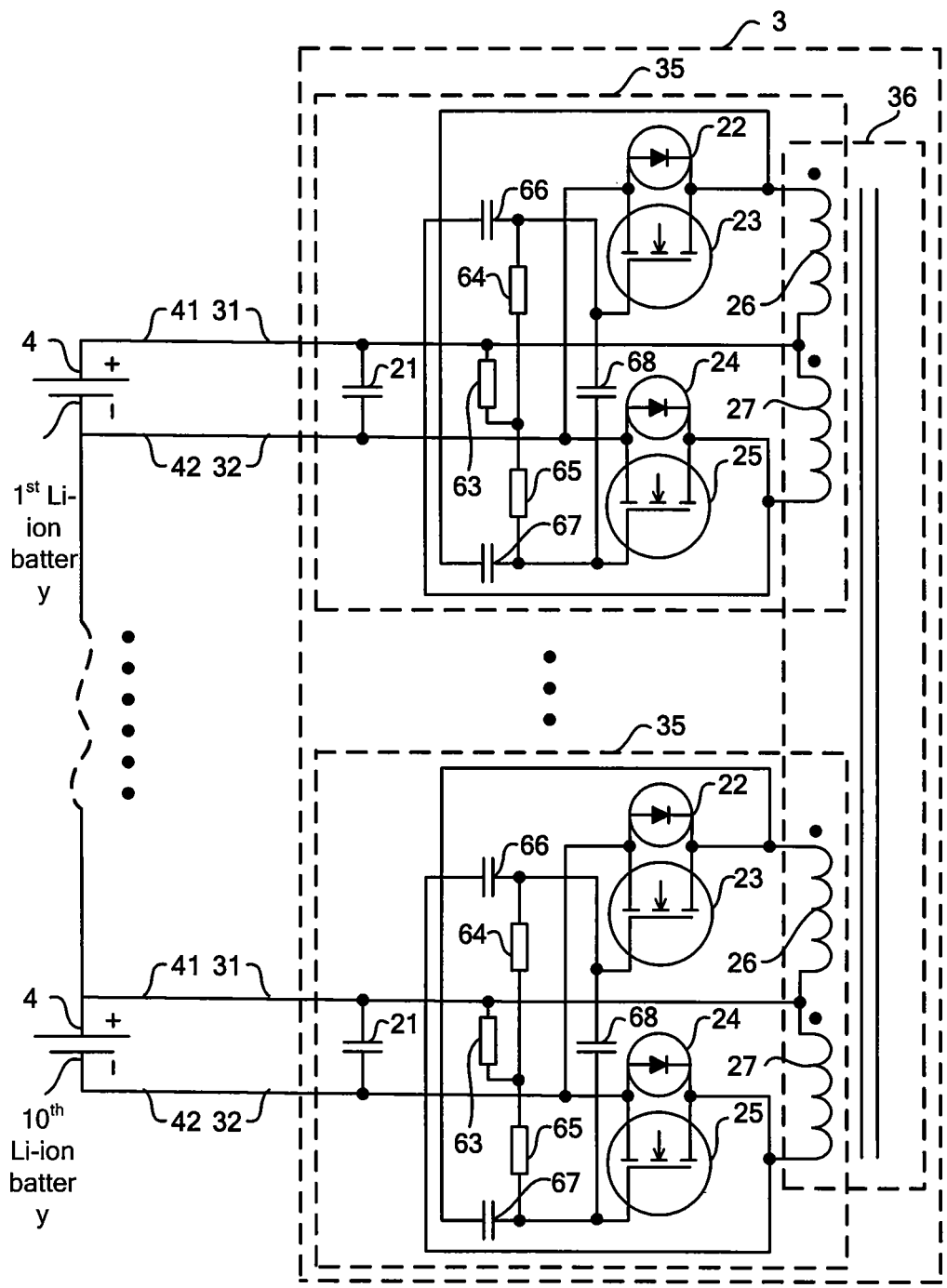
FIG. 13 is another circuit diagram showing an equalizing device to equalize a voltage of 10 Li-ion batteries according to an embodiment of the present invention.

In the circuits of FIG. 6, FIG. 7, FIG. 8, and FIG. 9, each equalizing 3 can also be synchronized by means of the first equalizing bus 1, the second equalizing bus 2, and the transformer 36, like circuits shown in FIGS. 12 and 13. In this case, the synchronous terminal 38 and the synchronous control bus 5 are not needed any more.

The bi-directional DC/AC converter circuit 35 or the bi-directional AC/DC converter circuit 37 can also adopt multiple types of voltage-conversion circuits, as long as the circuits can convert a DC voltage into an AC voltage and meanwhile can inversely recctify an AC voltage into a DC voltage. The voltage conversion can adopt a Forward circuit, a Flyback circuit, a Push-Pull circuit, a Half-Bridge circuit, a Full-Bridge circuit, and the like. The circuits can work in self-excited mode or in separately-driven mode, and the circuit, when in reverse, can recctify an AC voltage into a DC voltage. The circuits can adopt the soft switching technique and the synchronous rectification technique to increase its efficiency.

A conductor switch applicable to an embodiment of the present invention refers to a full-controlled power electronic device, including a giant transistor (GTR), a metal-oxide-semiconductor field-effect transistor (MOSFET), and an isolation gate bipolar transistor (IGBT). For convenience of description, terminals led out from the conductor switch are defined as follows: a collector of the GTR, a drain of the MOSFET, a collector of the IGBT, or a corresponding functional terminal of any other full-controlled power electronic device is defined as electrode 1 of the conductor switch; an emitter of the GTR, a source of the MOSFET, an emitter of the IGBT, or a corresponding functional terminal of any other full-controlled power electronic device is defined as electrode 2 of the conductor switch; and a base of the GTR, a gate of the MOSFET, a gate of the IGBT, or a corresponding functional terminal of any other full-controlled power electronic device is defined as electrode 3 of the conductor switch.

Figure 10:
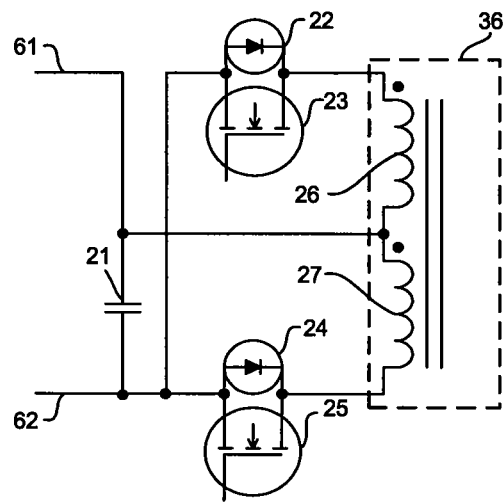
FIG. 10 is a circuit diagram of push-pull bi-directional voltage conversion for an equalizing device according to an embodiment of the present invention.

FIG. 10 shows a bi-directional voltage conversion circuit using a push-pull circuit. The circuit has a positive terminal 61 and a negative terminal 62, including a capacitor 21, a diode 22, a conductor switch 23, a diode 24, a conductor switch 25, a transforming winding 26 of a transformer 36, and a transforming winding 27 of the transformer 36. The transforming winding 26 and the transforming winding 27 are connected in series and have the same turn number. The transforming winding 26 and the transforming winding 27 share the same magnetic core with windings of other bi-directional voltage conversion circuits in the same equalizing device 3, and they are the same as those corresponding windings with the same name in other bi-directional voltage conversion circuits. In the same equalizing device 3, the conductor switch 23 and the conductor switch 25 are turned on or off at the same time as corresponding conductor switch 23 and corresponding conductor switch 25 in other bi-directional voltage conversion circuits.

When the circuit works, the conductor switch 23 and the conductor switch 25 take turns to be turned on and off alternatively. When energy flows from the positive terminal 61 and the negative terminal 62 towards the transformer 36, the circuit works in a reverse conversion mode, that is, converts a DC voltage into an AC voltage. In contrast, when the energy flows from the transformer 36 towards the positive terminal 61 and the negative terminal 62, the circuit works in a rectification mode, that is, rectifys an AC voltage into a DC voltage.

The circuit shown in FIG. 10 can be used as the bi-directional DC/AC converter circuit 35 and the bi-directional AC/DC converter circuit 37 according to an embodiment of the present invention. If the circuit shown in FIG. 10 acts as the bi-directional DC/AC converter circuit 35, the positive terminal 61 is the positive terminal 31 of the equalizing device 3, and the negative terminal 62 is the negative terminal 32 of the equalizing device 3. If the circuit shown in FIG. 10 acts as the bi-directional AC/DC converter circuit 37, the positive terminal 61 is the first equalizing terminal 33 of the equalizing device 3, and the negative terminal 62 is the second equalizing terminal 34 of the equalizing device 3. Bi-directional voltage conversion circuits of the other circuit structures can also act as the bi-directional DC/AC converter circuits 35 and 37 in the present invention, which will not be detailed herein.

In the circuits according to an embodiment of the present invention, the circuit structures of the bi-directional DC/AC converter circuits 35 or the bi-directional AC/DC converter circuits 37 can be the same or different.

When the equalizing device for proportionally equalizing the voltage of an energy-storage element according to an embodiment of the present invention is used, it is only necessary to connect the positive terminal of the energy-storage element with the positive terminal 31 of the equalizing device 3, and connect the negative terminal of the energy-storage element with the negative terminal 32 of the equalizing device 3. For energy-storage elements 4, the working mode and the connection mode are not restricted; its connection, combination, and working such as charging and discharging can be implemented in the manner that proportional equalization of the voltage is not added.

Through the circuit and method for proportionally equalizing a voltage according to the present invention, voltages of single units connected in series in a battery group or a capacitor group can be equalized, and the energy-storage element is the single unit of the battery or of the capacitor. In addition, through the circuit and method for proportionally equalizing a voltage according to the present invention, the terminal voltage of an energy-storage element group formed by two or more groups of different number of battery units or capacitor units can be equalized proportionally. If it is required to equalize the terminal voltage of each unit in different energy-storage element groups with the terminal voltage of each unit in the other groups, it is only necessary to treat any of all the units as an energy-storage element, because the present invention has no requirements on the connection between the energy-storage elements.

If one or more energy-storage elements are added with the first, second, third, or fourth equalizing 3 shown in FIG. 1, 2, 3, or 4 of the present invention, in use, the first equalizing bus 1 and the second equalizing bus 2 can be added, so that the first equalizing terminals 33 of all the equalizing devices 3 are connected with the first equalizing bus 1, and the second equalizing terminals 34 of all equalizing devices 3 are connected with the second equalizing bus 2. If the equalizing devices 3 have the synchronous terminals 38, a synchronous control bus 5 can be added, so that all synchronous terminals 38 are connected with the synchronous control bus 5. Thus, voltages of all the energy-storage elements that are connected can be proportionally equalized.

The equalizing device and the method according to an embodiment of the present invention mainly includes the following beneficial effects: for an equipment or system carrying a large number of energy-storage elements and requiring multiple voltage levels of power supplies, by using the equalizing device according to the embodiment of the present invention, terminal voltages of all the energy-storage elements can be proportionally equalized, and the energy-storage elements can be distributed at different places of the equipment or system. In addition, the number and the connection mode of the energy-storage elements close to each electrical appliance in the equipment or system can be configured to match the voltage and the current required by the electrical appliance thereby realizing optimization of power supply and space within the overall equipment or system, and sparing DC/DC converters used in the case that different electrical appliances require different voltages. Furthermore, by means of the first equalizing bus 1 and the second equalizing bus 2, any electrical appliance can use the energy of any energy-storage element installed at a different place, and when any one energy-storage element or one group of energy-storage elements is/are charged, all the other energy-storage elements are charged at the same time.

Figure 11:
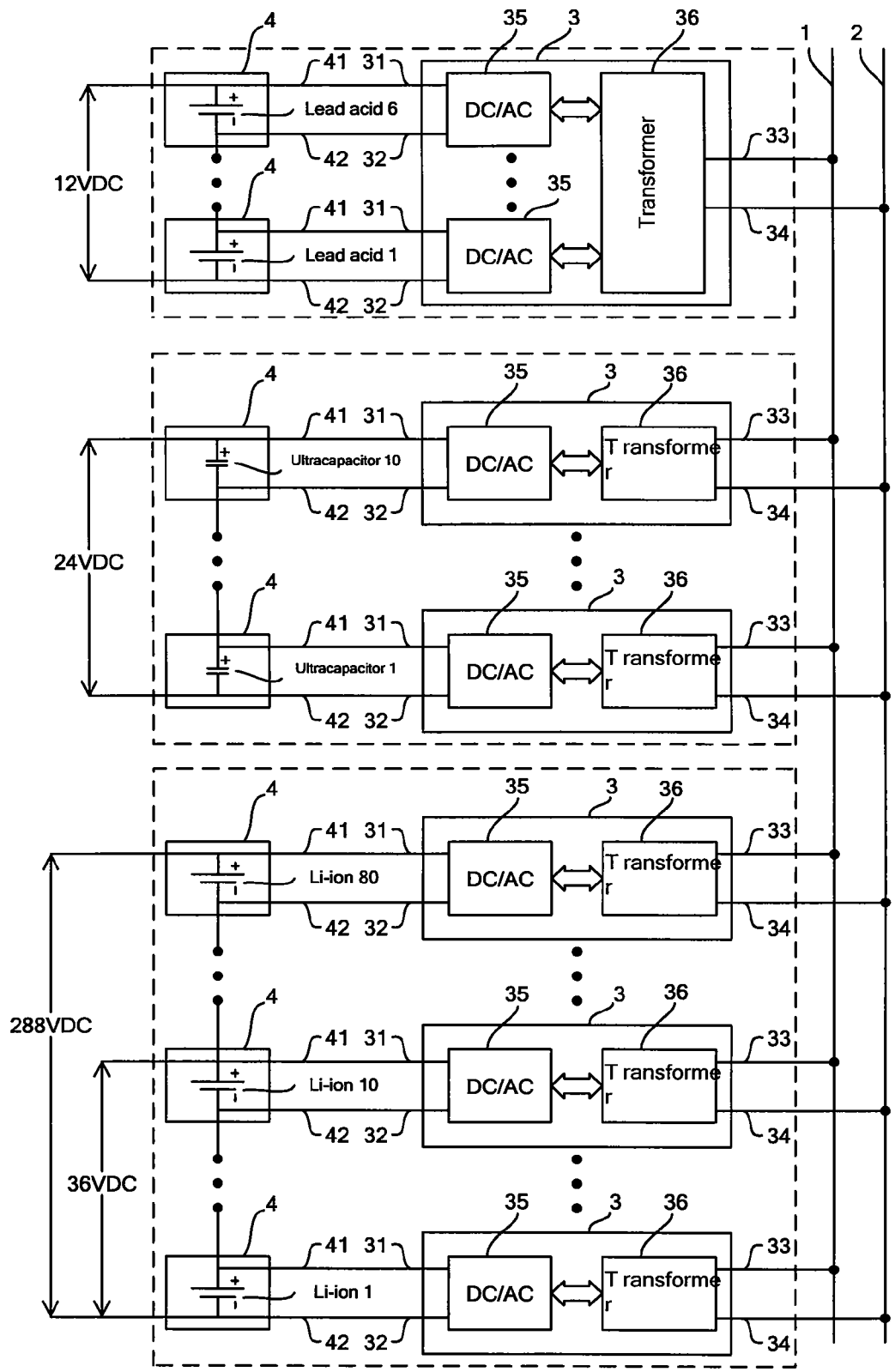
FIG. 11 is a circuit block diagram of a power supply system using an equalizing device according to an embodiment of the present invention.

For example, in the equipment powered by using energy-storage elements, if electrical appliances in the equipment require multiple types of voltages, e.g., 12V, 24V, 36V, and 288V, and the energy-storage elements in the equipment include a lead acid battery with a nominal voltage of 2V, an ultra-capacitor with a voltage of 2.5V, and a Li-ion battery with a nominal voltage of 3.6V, they can be configured by using the equalizing mode according to an embodiment of the present invention. As shown in FIG. 11, the positive terminal 41 and the negative terminal 42 of each energy-storage element 4 are respectively connected with the positive terminal 31 and the negative terminal 32 of each equalizing device 3. 12V is provided by six lead acid batteries connected in series, each of which has a nominal voltage of 2V. 24V is provided by 10 ultra-capacitors connected in series, each of which has a voltage of 2.5V. 288V is provided by 80 Li-ion batteries connected in series, each of which has a nominal voltage of 3.6V. 36V is provided by 10 of the 80 Li-ion batteries connected in series, each of which has a nominal voltage of 3.6V. The capacity of each energy-storage element is determined as required by the electrical appliance. The lead acid batteries, Li-ion batteries, and ultra-capacitors can be respectively placed at different locations of the equipment. It is assumed that an AC equalizing solution is adopted, and the equalizing devices 3 are synchronized by using the first equalizing bus 1, the second equalizing bus 2, and the transformer 36. In FIG. 11, six lead acid batteries connected in series are taken as a group, which uses one equalizing device 3 in FIG. 3 to equalize the voltages among one another, and the proportion equalization of the voltages between any of the six lead acid batteries and other energy-storage elements 4 is realized through the equalizing buses. Both 10 ultra-capacitors connected in series and 80 Li-ion batteries connected in series respectively use one equalizing device 3 shown in FIG. 1, so as to proportionally equalize the voltages among each other and the voltages of other energy-storage elements 4 through the equalizing buses. Supposing the maximum voltage supplied by a single lead acid battery is 2.4V, the maximum voltage supplied by an ultra-capacitor is 2.5V, and the maximum voltage supplied by a Li-ion battery is 4.2V, the equalizing bus voltage can be set arbitrarily, for example, set to U, the equalizing device 3 is designed in such a way that the ratio of the voltage between the positive terminal 31 and the negative terminal 32 of the equalizing device 3 connected with each lead acid battery to that of the equalizing bus is 2.4 U, the ratio of the voltage between the positive terminal 31 and the negative terminal 32 of the equalizing device 3 connected with each ultra-capacitor to that of the equalizing bus is 2.5 U, the ratio of the voltage between the positive terminal 31 and the negative terminal 32 of the equalizing 3 connected with each Li-ion battery to that of the equalizing bus is 4.2 U. In this way, when the circuit works, it can be realized that:

voltage of each lead acid battery:voltage of each ultra-capacitor:voltage of each Li-ion battery=2.4:2.5:4.2.

Thus, the voltage is equalized proportionally. When the energy-storage elements 4 in the power supply system of FIG. 11 are to be charged, it is feasible to only charge, for example, 80 Li-ion batteries, and then all the energy-storage elements 4 are charged through the process of proportional voltage equalization.

For example, one building or one district has multiple uninterrupted power supply (UPS) systems, and each UPS system is provided with batteries. By means of the equalizing method according to an embodiment of the present invention, not only voltages of all the batteries can be equalized proportionally, but also the batteries can be flexibly provided for each electrical appliance, so that each electrical appliance shares every battery, and the batteries are sufficiently utilized.

For example, an electrical equipment such as an electric vehicle can also adopt the method and device according to an embodiment of the present invention, and energy-storage elements used by the electric vehicle can be distributed and installed at different locations thereof, the voltages of which can be proportionally equalized and the electric energy of which can be shared, thereby not only making full use of the limited space in the electric vehicle, but achieving various voltage sources that are times of the voltages of single energy-storage elements, so as to spare DC/DC converters used in the case that different electrical appliances require different voltages.

The sixth equalizing device shown in FIG. 6 is used for equalizing the voltage of each single Li-ion battery in the battery group formed by 10 Li-ion batteries connected in series. The bi-directional DC/AC converter circuit 35 adopts the push-pull bi-directional voltage conversion circuit shown in FIG. 10, and the circuit works in self-excited mode. Each equalizing device 3 is synchronized by using the first equalizing bus 1, the second equalizing bus 2, and the transformer 36, and the specific circuit is shown in FIG. 12. In FIG. 12, the bi-directional DC/AC converter circuit 35 is the circuit shown in FIG. 10 added with a self-excited drive circuit, and the circuit is specifically added with a resistor 43, a resistor 44, a resistor 45, a resistor 46, a driving winding 28 of a transformer 36, and a driving winding 29 of the transformer 36. The transforming winding 26, the transforming winding 27, and the equalizing winding 30 have the same turn number of s. The equivalent DC voltage for the equalizing voltage equals to the terminal voltage after the voltage of each Li-ion battery is equalized.

In FIG. 12, when the voltage of a certain Li-ion battery is higher than the equalizing bus voltage, the energy flows from this Li-ion battery towards the first equalizing bus 1 and the second equalizing bus 2; when the voltage of a certain Li-ion battery is lower than the equalizing bus voltage, the energy flows from the first equalizing bus 1 and the second equalizing bus 2 towards the Li-ion battery; and finally, the voltage of the 10 Li-ion batteries is equalized.

The equalizing device 3 shown in FIG. 12 is a self-excited push-pull bi-directional voltage conversion circuit. When any equalizing device 3 is connected to the circuit and starts to work, the voltage of the Li-ion battery is divided by the resistor 43 and the resistor 44, and a voltage is generated across the resistor 44, which is applied to electrode 3 of the conductor switch 23 through the driving winding 28 and the resistor 45, and meanwhile is applied to electrode 3 of conductor switch 25 through the driving winding 29 and the resistor 46. Since the elements in the circuit cannot be completely symmetric, a certain conductor switch can always be firstly turned on. Supposing the conductor switch 23 is firstly turned on, a current at electrode 1 of the conductor switch 23 flows through the transforming winding 26 to magnetize the iron core of the transformer 36, and meanwhile, the other windings also generate an induced potential. The induced potential generated in the driving winding 29 makes electrode 3 of the conductor switch 25 be in negative level and maintain an OFF state. The potential generated in the driving winding 28 further increases the current at electrode 1 of the conductor switch 23 such that the conductor switch 23 quickly reaches a saturated conductive state. At this time, the voltages of almost all batteries are applied to two ends of the transforming winding 26. Thus, the current in the transforming winding 26 and the magnetic flux generated by the current are increased linearly. When the magnetic flux of the iron core in the transformer 36 approaches or reaches a saturation value, a current at electrode 1 of the conductor switch 23 dramatically increases, and forms a peak value. At this time, the changing rate of the magnetic flux approaches zero, and therefore the induced potentials of all windings in the transformer 36 also approach zero. Because the induced potential across two ends of the driving winding 28 approaches zero, a current at electrode 3 of the conductor switch 23 is reduced, and the current at electrode 1 of the conductor switch 23 starts to drop. Thus, the induced potentials of all windings in the transformer 36 are reversed. Then, the iron core of the transformer 36 is out of saturation, which causes the conductor switch 23 to quickly enter a cut-off state, and the conductor switch 25 quickly enters into a saturated conductive state. At this time, the voltages of almost all the batteries are applied to both ends of the transforming winding 27, and then the magnetic flux in the iron core of the transformer decreases linearly and quickly reaches a reversed saturation state. By then, the induced potential of the driving winding 29 decreases, so that the conductor 25 is out of saturation and then turns into a cut-off state, whereas the conductor switch 23 again turns into a saturated conductive state. The above process repeates, and as a result, a square-wave voltage is formed at electrodes 1 of the two conductor switches, which forms a square-wave voltage at both ends of the equalizing winding 30, that is, forms a square-wave voltage between the first equalizing terminal 33 and the second equalizing terminal 34.

The first equalizing terminals 33 of all equalizing devices 3 are connected to the first equalizing bus 1, and the second equalizing terminals 34 of all equalizing devices 3 are connected to the second equalizing bus 2. Therefore, the equalizing windings 30 of the transformers 36 in all equalizing devices 3 are connected in parallel, and thus the voltages across both ends of the equalizing windings 30 in all equalizing devices 3 change simultaneously. When the conductor switch 23 in any equalizing device 3 is conducted firstly, the conductor switch 25 in the equalizing device 3 is cut-off; by means of the conduction of the first equalizing bus 1 and the second equalizing bus 2 and the coupling of the corresponding transformer 36, the conductor switches 23 in other equalizing devices are conducted, and the conductor switches 25 in other equalizing devices are cut-off. Thus, all conductor switches 23 are conducted almost at the same time, and the conductor switches 25 are cut-off almost at the same time. When the magnetic flux of the iron core of the transformer 36 in any equalizing device 3 is saturated, upon the conduction of the first equalizing bus 1 and the second equalizing bus 2, the magnetic flux of the iron core of the transformer 36 in any other equalizing device 3 becomes saturated, and then all conductor switches 23 are cut-off almost at the same time and the conductor switches 25 are turned on almost at the same time. In this way, the conductor switches 23 in all equalizing devices are turned on or off almost at the same time, and the conductor switches 25 are turned on or off almost at the same time, and thus all equalizing devices 3 work synchronously.

The fifth equalizing device shown in FIG. 5 is used to equalize the voltage of each Li-ion battery in the Li-ion battery group formed by 10 Li-ion batteries connected in series, and the bi-directional DC/AC converter circuit 35 adopts a push-pull bi-directional voltage conversion circuit shown in FIG. 10, which works in self-excited mode, as specifically shown in FIG. 13. In FIG. 13, the bi-directional DC/AC converter circuit 35 is the circuit of FIG. 10 added with a self-excitation drive circuit, and the circuit is specifically added with a resistor 63, a resistor 64, a resistor 65, a capacitor 66, a capacitor 67, and a capacitor 68.

For the transformer 36 shown in FIG. 13, the transforming windings corresponding to the bi-directional DC/AC converter circuit 35 for each energy-storage element 4 are together wound on one magnetic core of the transformer, and all bi-directional DC/AC converter circuits 35 share one transformer 36. With regard to the working process of the circuit shown in FIG. 13, the analyses about the push-pull self-excited circuit shown in the circuit of FIG. 10, the circuit of FIG. 12, and the circuit of the switching power supply in the present invention can be referred to, which will not be described herein.

The preceding description about the equalizing devices according to embodiments of the present invention has clearly elaborated the steps and procedures of the method for equalizing the voltage of an energy-storage element according to an embodiment of the present invention, which will not be described repeatedly, for the sake of simplicity.

The present invention has been detailed above through specific embodiments. However, it should be understood that these embodiments are only demonstrative rather than restricting the present invention. Persons skilled in the art can easily make various changes, modifications, combinations, as well as equivalent replacement on the above embodiments, so as to apply the device of the present invention into various situations. In addition, some terms used in the description and claims of the present invention are only intended to describe the present invention conveniently and easily, instead of restricting the present invention. Therefore, any implementation mode that is not departing from the spirits of the present invention belongs to the protection scope of the present invention.

What is claimed is:

1. A device for equalizing voltages of energy-storage elements, comprising:
   at least one transformer, comprising at least one equalizing winding and at least one transforming winding;
   at least one bi-directional DC/AC converter circuit, wherein DC terminals of each bi-directional DC/AC converter circuit are configured as a positive terminal and a negative terminal adapted to connect to an energy-storage element, and AC terminals of each bi-directional DC/AC converter circuit are connected with the transforming winding of the transformer; and
   a first equalizing bus and a second equalizing bus, wherein the equalizing winding of the transformer is connected with the first equalizing bus and the second equalizing bus, and the bi-directional DC/AC converter circuit and the transformer are configured such that a voltage applied between the DC terminals of the bi-directional DC/AC converter circuit versus an equivalent DC voltage of a AC voltage across the equalizing winding of the transformer remains a certain ratio, and wherein a ratio of a turn number of the transforming winding, which corresponds to each pair of positive and negative terminals, to a turn number of the equalizing winding thereof, is equal to a ratio of voltages to be realized between each pair of positive and negative terminals.

2. The device according to claim 1, further comprising:
at least one bi-directional AC/DC converter circuit, wherein the equalizing winding of the transformer is connected with AC terminals of the bi-directional AC/DC converter circuit instead of the first and second equalizing buses, and DC terminals of the bi-directional AC/DC converter circuit are connected with the first and second equalizing buses, wherein
the bi-directional DC/AC converter circuit, the transformer, and the bi-directional AC/DC converter circuit are configured such that a voltage applied between the DC terminals of the bi-directional DC/AC converter circuit versus an voltage between the DC terminals of the bi-directional AC/DC converter circuit remains a certain ratio.

3. The device according to claim 1, wherein a voltage between the first equalizing bus and the second equalizing bus can be set to any value excluding zero.

4. The device according to claim 2, wherein a voltage between the first equalizing bus and the second equalizing bus can be set to any value excluding zero.

5. The device according to claim 1, wherein the bi-directional DC/AC converter circuit further comprise a synchronous terminal.

6. The device according to claim 5, further comprising:
a synchronous control bus, for connecting with the synchronous terminal and realizing synchronization of each bi-directional DC/AC converter circuit.

7. A device for equalizing voltages of energy-storage elements, comprising:
at least one transformer, comprising two or more transforming windings; and
two or more bi-directional DC/AC converter circuits, wherein DC terminals of each bi-directional DC/AC converter circuit are configured as a positive terminal and a negative terminal adapted to connect to an energy-storage element, and AC terminals of each bi-directional DC/AC converter circuit are connected with a respective transforming winding of the transformer, wherein
the bi-directional DC/AC converter circuits and the transformer are configured such that voltages between the DC terminals of each bi-directional DC/AC converter circuit remains a certain ratio, and wherein a ratio of turn numbers of the transforming windings, which corresponds to each pair of positive and negative terminals, is equal to a ratio of voltages to be realized between each pair of positive and negative terminals.

8. The device according to claim 7, wherein a ratio of turn numbers of the transforming windings of the transformer corresponding to each pair of positive terminal and negative terminal is set to being equal to a ratio of voltages to be realized between each pair of positive terminal and negative terminal.

9. A method for equalizing voltages of energy-storage elements, comprising steps:
using a bi-directional DC/AC converter circuit, respectively performing a DC/AC conversion on a terminal voltage of each energy-storage element which is higher than a value to be realized by the energy-storage element according to a predetermined voltage ratio to be realized by all energy-storage elements;
coupling the DC/AC converted voltage into a pair of equalizing buses through a transformer having at least one transforming winding and at least one equalizing winding; and
coupling the voltage from the equalizing buses respectively to a bi-directional DC/AC converter circuit corresponding to each energy-storage element with a terminal voltage lower than a value to be realized through the transformer, and then respectively converting the voltage in a manner of AC/DC conversion to each energy-storage element with the terminal voltage lower than a value to be realized, wherein the bi-directional DC/AC converter circuit and the transformer are configured such that the bi-directional voltage conversion is carried out in a manner such that a voltage between the DC terminals of the bi-directional DC/AC converter circuit versus an equivalent DC voltage of a AC voltage across the equalizing winding of the transformer remains a certain ratio, and wherein a ratio of a turn number of the transforming winding, which corresponds to each pair of positive and negative terminals, to a turn number of the equalizing winding thereof, is equal to a ratio of voltages to be realized between each pair of positive and negative terminals.

10. The method according to claim 9, further comprising step:
performing a bi-directional AC/DC conversion on the voltage after being transformed but before being coupled to the equalizing buses via a bi-directional AC/DC converter circuit, wherein
the bi-directional DC/AC converter circuit, the transformer, and the bi-directional AC/DC converter circuit are configured such that the bi-directional voltage conversion is carried out in a manner that a voltage between the DC terminals of the bi-directional DC/AC converter circuit versus a voltage between the DC terminals of the bi-directional AC/DC converter circuit remains a certain ratio.

11. The method according to claim 9, further comprising step: synchronizing the bi-directional DC/AC conversion.

12. A method for equalizing voltages of energy-storage elements, comprising steps:
using a bi-directional DC/AC converter circuit, respectively performing a DC/AC conversion on a terminal voltage of each energy-storage element which is higher than a value to be realized by the energy-storage element according to a predetermined voltage ratio to be realized by all energy-storage elements; and
respectively coupling the DC/AC converted voltage to a bi-directional DC/AC converter circuit corresponding to each energy-storage element with a terminal voltage lower than a value to be realized through a multi-winding transformer having at least two transforming windings, and then respectively converting the voltage in a manner of AC/DC conversion to each energy-storage element with the terminal voltage lower than a value to be realized, wherein
the bi-directional DC/AC converter circuits and the transformer are configured such that the bi-directional voltage conversion is carried out in a manner that voltages between the DC terminals of each bi-directional DC/AC converter circuit remains a certain ratio, and wherein a ratio of turn numbers of the transforming windings, which corresponds to each pair of positive and negative terminals, is equal to a ratio of voltages to be realized between each pair of positive and negative terminals.

* * * * *